US011087337B2

(12) United States Patent
Arvapally et al.

(10) Patent No.: US 11,087,337 B2
(45) Date of Patent: Aug. 10, 2021

(54) SYSTEMS AND METHODS FOR USE IN EVALUATING AGGREGATE MERCHANT SETS

(71) Applicant: MASTERCARD INTERNATIONAL INCORPORATED, Purchase, NY (US)

(72) Inventors: Ravi Santosh Arvapally, O'Fallon, MO (US); Matthew S. Morice, St. Charles, MO (US); Walter F. Lo Faro, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 17 days.

(21) Appl. No.: 16/667,423

(22) Filed: Oct. 29, 2019

(65) Prior Publication Data

US 2020/0065837 A1    Feb. 27, 2020

Related U.S. Application Data

(63) Continuation of application No. 14/978,602, filed on Dec. 22, 2015, now Pat. No. 10,475,052.

(51) Int. Cl.
*G06Q 30/02* (2012.01)

(52) U.S. Cl.
CPC .............. *G06Q 30/0201* (2013.01)

(58) Field of Classification Search
CPC .................................. G06Q 30/0201
(Continued)

(56) References Cited

U.S. PATENT DOCUMENTS 8,219,550 B2    7/2012  Merz et al.
10,475,052 B2   11/2019 Arvapally et al.
(Continued)

FOREIGN PATENT DOCUMENTS

KR    20110086529 A  *  7/2011
KR    20110086529 A     7/2011

OTHER PUBLICATIONS

Joseph S. Lombardo, Essence II and the Framework for Evaluating Syndromic Surveillance Systems, 2004 (Year: 2004).*
(Continued)

*Primary Examiner* — Tarek Elchanti
(74) *Attorney, Agent, or Firm* — Harness, Dickey & Pierce, P.L.C.

(57) ABSTRACT

Systems and methods are provided for evaluating aggregate merchant sets, which are often generated by a payment network. One exemplary method includes accessing, by a computing device, a monitor score and a volatility score for an aggregate merchant set representative of multiple merchants having at least one disparate parameter in a transaction data structure, fuzzy sets for the monitor score and the volatility score comprising linguistic values, and inference rules that use the linguistic values in logical operations. The method also generally includes determining degrees of membership of the monitor score and volatility score to the associated fuzzy sets and generating an evaluation index based on the inference rules and the degrees of membership to the fuzzy sets, thereby providing an indication of a propriety of the aggregation of said multiple merchants.

15 Claims, 5 Drawing Sheets

(58) Field of Classification Search
USPC .......................................................... 705/7.29
See application file for complete search history.

(56) References Cited

U.S. PATENT DOCUMENTS

| | | |
|---|---|---|
| 2014/0258246 A1 | 9/2014 | Lo Faro et al. |
| 2015/0106244 A1 | 4/2015 | Lo Faro |
| 2017/0178155 A1 | 6/2017 | Arvapally et al. |

OTHER PUBLICATIONS

Joseph S. Lombardo et al., "Essence II and the Framework for Evaluating Syndromic Surveillance Systems", Sep. 24, 2004; 12 pgs.

* cited by examiner

SYSTEMS AND METHODS FOR USE IN EVALUATING AGGREGATE MERCHANT SETS

CROSS-REFERENCE TO RELATED APPLICATION

This application is a continuation of U.S. patent application Ser. No. 14/978,602 filed on Dec. 22, 2015. The entire disclosure of the above application is incorporated herein by reference.

FIELD

The present disclosure generally relates to systems and methods for use in evaluating aggregate merchant sets, and in particular, to systems and methods for use in generating evaluation indexes for aggregate merchant sets, which are indicative of potential need to audit the aggregate merchant sets.

BACKGROUND

This section provides background information related to the present disclosure which is not necessarily prior art.

Consumers often use payment accounts to purchase various different products (e.g., good and services, etc.) from merchants. The transaction data from the purchases is often subjected to one or more analytical techniques in order to gain insights, characteristics, and/or predictors into or for the consumers and/or the merchants involved in the transactions. The techniques, in at least certain instances, involve aggregations of the merchants (as identified in the transaction data), where the aggregated merchants are, in fact, the same but may be identified as variations in the transaction data. As such, when the aggregate merchants are then subjected to the techniques indicated above, the quality and/or usefulness of the results may depend on the accuracy of the aggregation of the merchants.

DRAWINGS

The drawings described herein are for illustrative purposes only of selected embodiments and not all possible implementations, and are not intended to limit the scope of the present disclosure.

Figure 1:
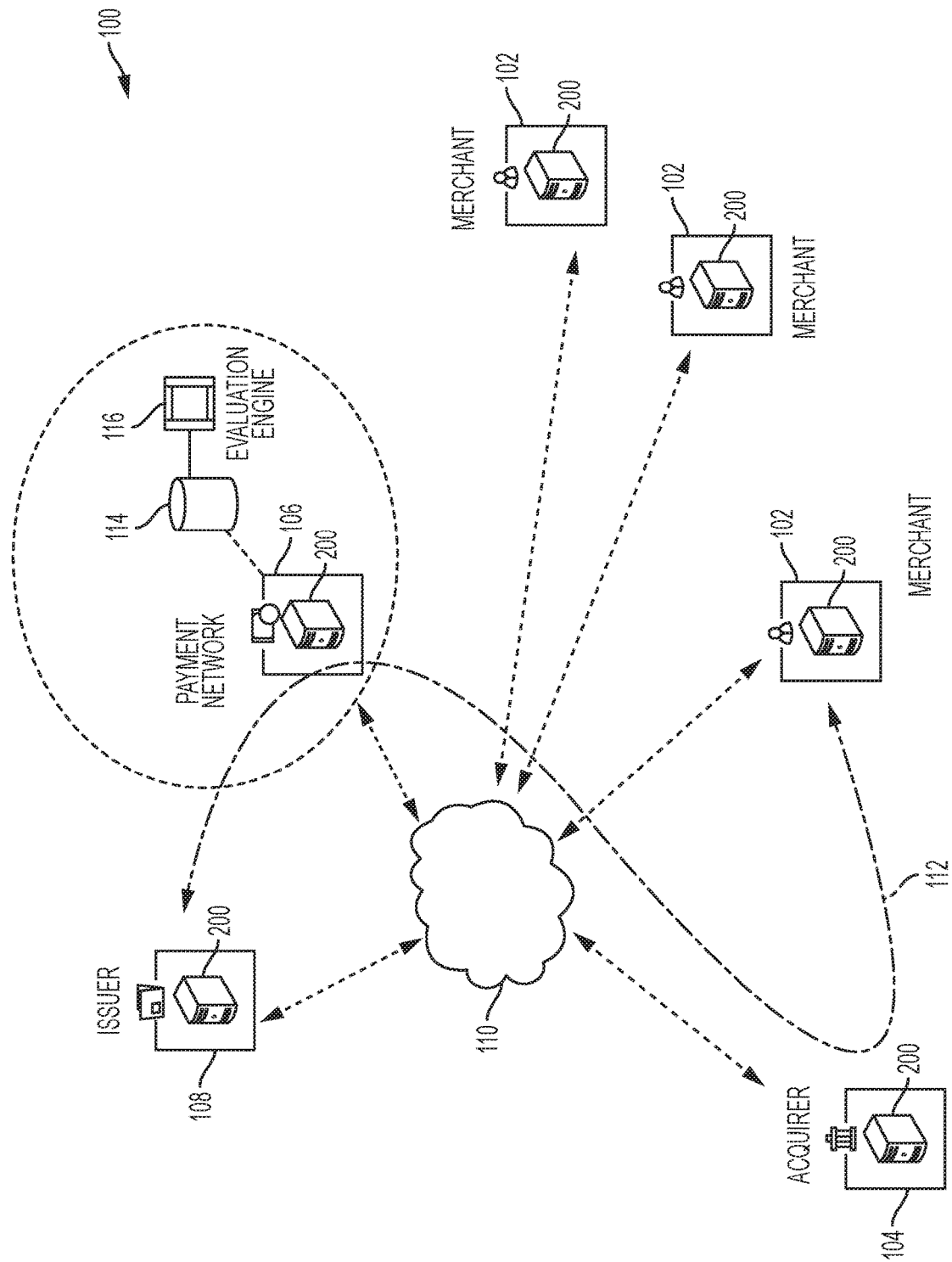
FIG. 1 is a block diagram of an exemplary system of the present disclosure suitable for use in evaluating aggregate merchant sets.
Figure 3:
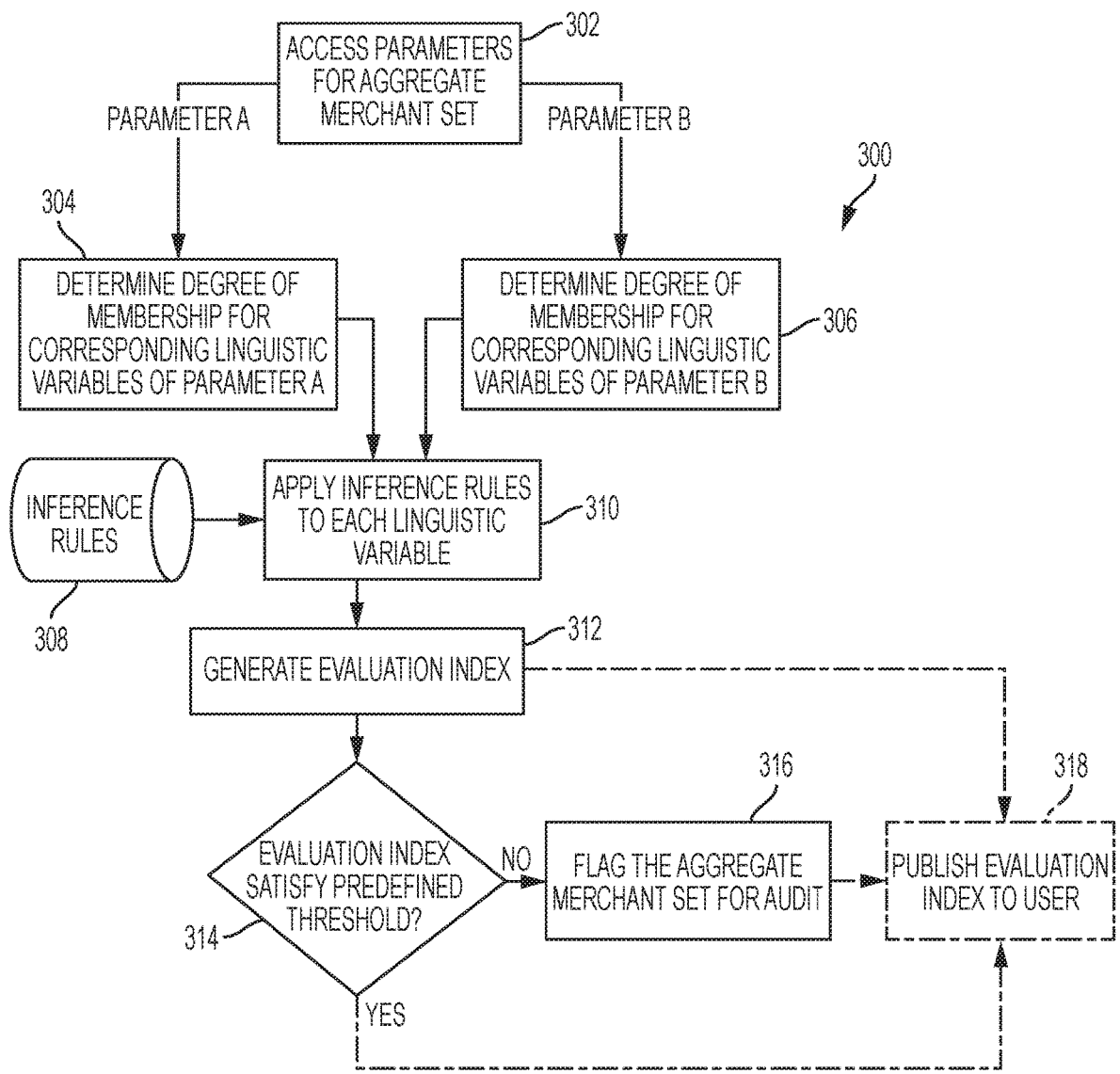
FIG. 3 is an exemplary method for evaluating aggregate merchant sets, which may be implemented in the system of FIG. 1.
Figure 4:
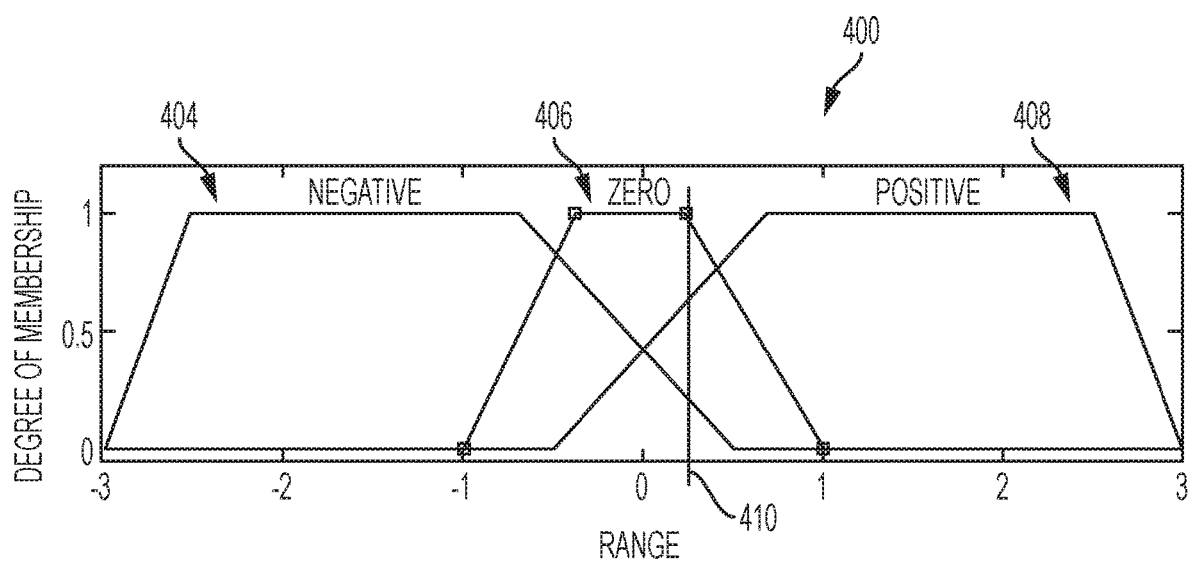
Figure 5:
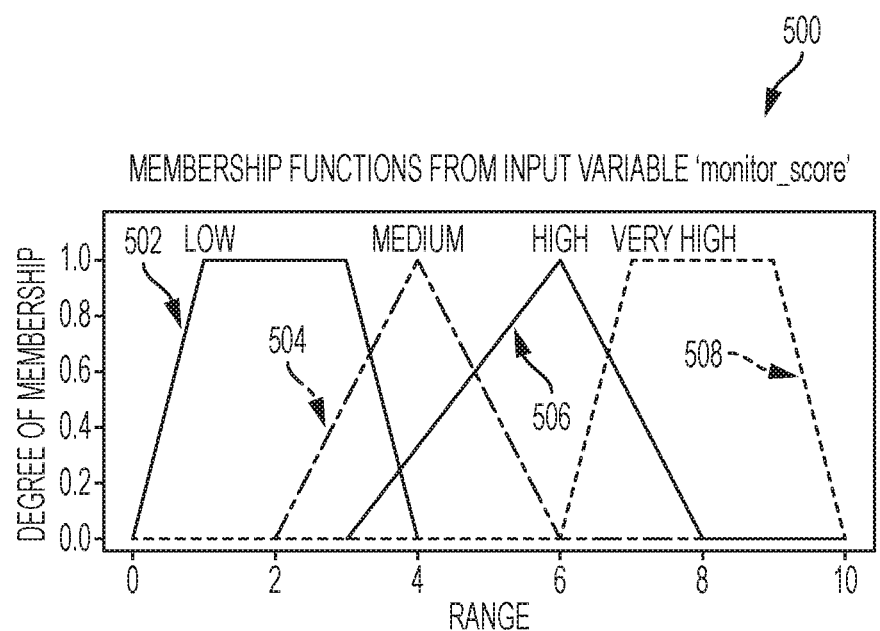

FIG. 4 illustrates a chart of an exemplary membership function associated with a fuzzy set having three linguistic variables for a monitoring score, and suitable for use in the system of FIG. 1 and/or the method of FIG. 3; and FIG. 5 illustrates a chart of an exemplary membership function associated with a fuzzy set having four linguistic variables for a monitoring score, and suitable for use in the system of FIG. 1 and/or the method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Transaction data is often used by acquirers, payment networks, issuers, and/or others to determine insights into, characteristics of, or predictors associated with consumers and/or the merchants involved in payment account transactions. In one or more techniques for doing so, transaction data is analyzed to determine the presence of duplicative or multiple merchants and to group the same merchants into aggregate merchant sets (when appropriate), so that all transaction data for the same merchants (or merchant sets) may be subjected, together, to analytical techniques to thereby provide more accurate analytics for the transaction data. Uniquely, the systems and methods herein provide for one or more evaluation indexes to be generated for each of the aggregate merchant sets, to indicate potential need for audits of the aggregate merchant sets. In particular, certain parameters of the aggregate merchant sets are subjected to fuzzification, relative to sets of variables, and then combined based on one or more fuzzy rules to yield the evaluation indexes for the aggregate merchant sets. The evaluation indexes are then compared to predefined thresholds to determine whether audits of the aggregate merchant sets are needed, or recommended. In this manner, the necessity of auditing aggregate merchant sets can be determined using objective indicia, based on parameters associated with the aggregate merchant sets, any of which may be changed over time to increase accuracy of the determinations.

FIG. 1 illustrates an exemplary system 100, in which the one or more aspects of the present disclosure may be implemented. Although the system 100 is presented in one arrangement, other embodiments may include systems arranged otherwise depending, for example, on identification of aggregate merchants, processing transactions involving certain merchants and/or consumers, etc.

As shown in FIG. 1, the system 100 generally includes multiple merchants 102a-c, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which is accessible as desired to the merchant 102, the acquirer 104, the payment network 106, and the issuer 108.

The merchants 102a-c are generally associated with products (e.g., goods and/or services, etc.) for purchase by one or more consumers, for example, via payment accounts. The merchants 102a-c, for example, may include online merchants, having virtual locations on the Internet (e.g., websites accessible through the network 110, etc.), or through internet-based applications, etc., to permit consumers to initiate transactions for products offered by the merchants 102a-c for purchase. In addition, or alternatively, the merchants 102a-c may include at least one brick-and-mortar location.

In connection with a purchase by a consumer at merchant 102a, for example, via a payment account, an authorization request is generated at the merchant 102a and transmitted to the acquirer 104, consistent with path 112 in FIG. 1. The acquirer 104, in turn, as further indicated by path 112, communicates the authorization request to the issuer 108, through the payment network 106, such as, for example, through MasterCard®, VISA®, Discover®, American Express®, etc., to determine (in conjunction with the issuer 108 that provided the payment account to the consumer) whether the payment account is in good standing and whether there is sufficient credit/funds to complete the transaction. If the issuer 108 accepts the transaction, a reply authorizing the transaction is conventionally provided back to the acquirer 104 and the merchant 102, thereby permitting the merchant 102 to complete the transaction. The transaction is later cleared and/or settled by and between the merchant 102 and the acquirer 104 (via an agreement between the merchant 102 and the acquirer 104), and by and between the acquirer 104 and the issuer 108 (via an agreement between the acquirer 104 and the issuer 108) (through further communications therebetween). If the issuer 108 declines the transaction for any reason, a reply declining the transaction is provided back to the merchant 102, thereby permitting the merchant 102 to stop the transaction.

Transaction data is generated, collected, and stored as part of the above interactions among the merchant 102, the acquirer 104, the payment network 106, the issuer 108, and the consumer. The transaction data represents at least a plurality of transactions, for example, authorized transactions, cleared transactions, attempted transactions, etc. The transaction data, in this exemplary embodiment, is stored at least by the payment network 106 (e.g., in a data structure associated with the payment network 106, etc.). The transaction data includes, for example, payment instrument identifiers such as payment account numbers, amounts of the transactions, merchant IDs, merchant category codes (MCCs), dates/times of the transactions, products purchased and related descriptions or identifiers, etc. It should be appreciated that more or less information related to transactions, as part of either authorization, clearing, and/or settling, may be included in transaction data and stored within the system 100, at the merchant 102, the acquirer 104, the payment network 106, and/or the issuer 108.

In various exemplary embodiments, the consumers involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions, subsequently for one or more of the different purposes described herein.

With continued reference to FIG. 1, each of the merchants 102a-c, in this exemplary embodiment, are different locations of the same aggregate merchant 102 (i.e., should be incorporated together) but, for one or more reasons, are identified in transaction data as different. For example, the merchants 102a-c may have different addresses. Or, the merchants 102a-c may include one or multiple point-of-sale (POS) terminals that are programmed differently, for various reasons, such that transaction data generated from one or more of the terminals, as described above, is different (although often only slightly). In particular, one of the POS terminals may be programmed with one or more variations of the merchant's actual name (e.g., Jim's Groceries verses the actual merchant name of Jim's Grocery Store, etc.), the merchant's actual address (e.g., 123 Main St. versus the actual merchant address of 123 E. Main Street, etc.), the merchant ID, the MCC, a transaction ID, etc., which prevent transaction data from the different POS terminals, and/or from the merchants 102a-c, from being combined immediately by the payment network 106. In other embodiments, the merchants 102a-c may represent different POS terminals of the aggregate merchant 102 at the same merchant location, where each POS terminal is identified in transaction data as different.

In this exemplary embodiment, the payment network 106 employs one or more techniques to compile the merchants 102a-c into an aggregate merchant set (i.e., identify all of merchants 102a-c as one aggregate merchant 102), based on the underlying transaction data associated with the merchants 102a-c. For example, the payment network 106 may attempt to aggregate the merchants 102a-c, from transaction data associated with the merchants 102a-c, based on short doing-business-as (DBA) name, acquiring merchant ID, tax ID, address, MCC, etc. However, as previously described, various transaction data for the merchants 102a-c may not be consistent or may change (e.g., short DBA names may be different, MCCs may be different, etc.), and one of the merchants 102a-c may look different than the others such that it is not immediately aggregated with the others. As such, the payment network may employ various additional techniques to aggregate the merchants 102a-c including, for example, those described in Applicant's co-owned U.S. Pat. No. 8,219,550, issued Jul. 10, 2012, U.S. application Ser. No. 13/791,078, filed Mar. 8, 2013, and U.S. application Ser. No. 14/054,340, filed Oct. 15, 2013, the entire disclosures of which are all incorporated herein by reference.

In any case, in aggregating the merchants 102a-c, one or more disparate parameters related to the resulting aggregate merchant set are generated and/or result, often based on the one or more techniques involved in compiling the aggregate merchants 102a-c into the set, etc. The parameter(s) may provide insight into the particular technique of aggregation employed, a confidence or accuracy in the resulting aggregation and/or aggregate merchant set, a need to reevaluate the aggregation and/or aggregate merchant set, and/or other metric(s) for the aggregate merchant set, etc.

Without limitation, the parameters of the aggregate merchant set for merchant 102 may include, for example, a merchant monitoring score, a volatility score, a last audit date for the aggregate merchant set, a count/number of merchants included in the aggregate merchant set, a predictor score, etc. While various other parameters may be included or associated with the aggregate merchant set, for ease of discussion, the following makes reference to these five parameters, which are also identified in Table 1, along with example ranges. It should be appreciated that the ranges in Table 1 are only exemplary in nature, and may be changed or may differ as desired or as appropriate.

TABLE 1

| Parameter | Example Range | Description |
| --- | --- | --- |
| monitor_score | 0 to 10 | Merchant monitoring score |
| volatility_score | 0 to 10 | Aggregate volatility score |
| last_audit_date | 0 to 10 | Appropriate normalization as per the requirement |
| agg_merchant_count | 0 to 10 | Count merchants in an aggregate |
| agg_predictor_score | 0 to 10 | A score from aggregate predictor system |

In connection with the merchant monitoring score, a suitable model is used to predict one or more variable values for a given aggregate merchant. The predicted values are then compared to actual values for the one or more variables, and a score is created based on the deviation (e.g., for each variable, as a cumulative score for the aggregate merchant, etc.). An example variable may include a weekly volume value of the aggregate merchant (e.g., in revenue, products sold, etc.). The merchant monitoring score is generated from this deviation. The merchant monitoring score is often provided according to a particular range, for example, 0 to 10, etc., as indicated in Table 1.

The volatility score represents (e.g., is generated based on, etc.) a difference between historical volume of the aggregate merchant based off of a previous definition and historical volume of the aggregate merchant based off of a current definition. The higher the difference the more volatile the aggregate merchant. The volatility score is often provided according to a particular range, for example, 0 to 10, etc., as indicated in Table 1.

The last audit date provides information on when the aggregate merchant was last audited. The last audit date for the aggregate merchant set is represented as a last audit date score. This score is indicative of a number of days since a previous audit of the aggregate merchant set, and may be provided according to a particular range, for example, 0 to 10, etc., as indicated in Table 1. For example, the last audit dates of all available aggregate merchants may be taken and normalized in order to range from 0 to 10.

The count/number of merchants included in the aggregate merchant set is represented by an aggregate merchant count score. The aggregate merchant count score is indicative of the number of different merchants (i.e., the number of merchants that are not identical to the aggregate merchant 102) within the aggregate merchant set. The aggregate merchant count score is provided according to a particular range, for example, 0 to 10, etc., as indicated in Table 1. For example, if merchant A is known to have 500 locations based on outside data, but transaction data for the aggregate merchant A only indicates 400 locations, the aggregate merchant count score may be high indicating an audit is necessary.

The predictor score identifies locations that are similar to the location(s) of the aggregate merchant. Based on the number of predicted locations returned, a score is generated for the uniqueness of the aggregate merchant. For example, if only one record is returned having a similar location to that of the aggregate merchant then there are very few things that "look like" the location(s) that are already known for the aggregate merchant, so missing locations are less likely and the predictor score is lower. However, if 1,000 records are returned, while they might not be ones that need to be included, they do indicate that there is a greater risk of locations missing from the aggregate merchant or being added in error. The predictor score may be provided according to a particular range, for example, 0 to 10, etc., as indicated in Table 1.

With further reference to FIG. 1, once the aggregate merchant set for merchants 102a-c is compiled by the payment network 106, the set is stored in an aggregate data structure 114. In addition, various rules defining the aggregate merchant set (e.g., rules to assign transaction data for each of merchants 102a-c to master merchant 102, etc.), as well as the corresponding parameters of the aggregate merchant set (e.g., parameters identified in Table 1, etc.), are also stored in the data structure 114 and associated with the set. Subsequently, the payment network 106 employs the rules to identify and aggregate future and/or past transaction data for merchants 102a-c as transaction data for master merchant 102, for example, in connection with one or more analytical operations offered by the payment network 106 (e.g., as part of data analytics services, etc.) or for otherwise processing the transaction data in one way or another.

While one acquirer 104, one payment network 106, one issuer 108, and three merchants 102a-c are illustrated in the system 100 of FIG. 1, it should be appreciated that any number of these parts (and their associated components) may be included in the system 100, or may be included as a part of systems in other embodiments, consistent with the present disclosure.

Figure 2:
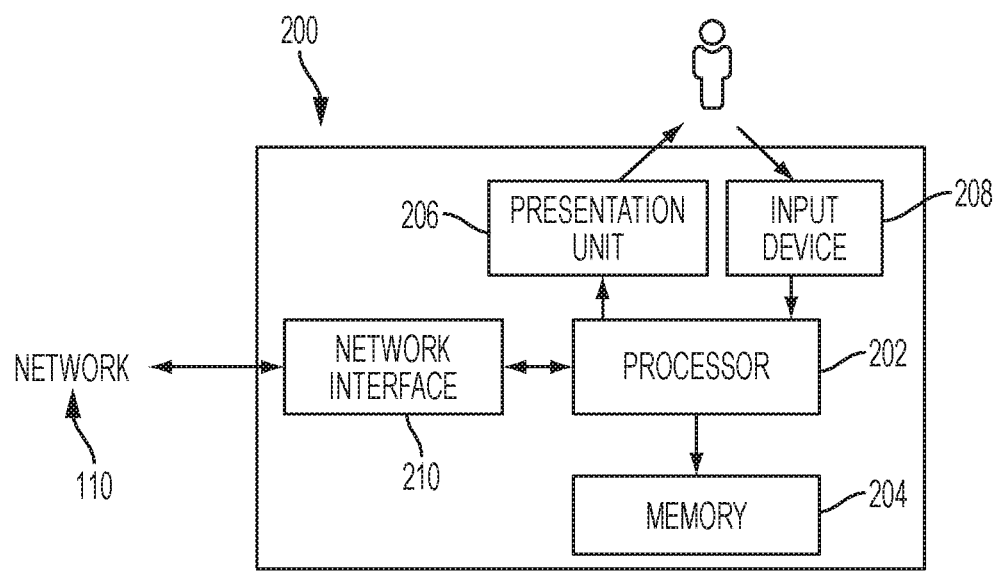
FIG. 2 is a block diagram of a computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the merchants 102a-c, the acquirer 104, the payment network 106, and the issuer 108 are illustrated as including, or being implemented in or associated with, a computing device 200, coupled to the network 110. Further, the computing devices 200 associated with these parts of the system 100, for example, may include a single computing device, or multiple computing devices located in close proximity or distributed over a geographic region, again, so long as the computing devices are specifically configured to function as described herein.

Referring to FIG. 2, the exemplary computing device 200 includes a processor 202 and a memory 204 coupled to (and in communication with) the processor 202. The processor 202 may include one or more processing units (e.g., in a multi-core configuration, etc.) such as, without limitation, one or more of a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, parameters of aggregate merchant sets, fuzzification rules, fuzzy variable sets, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206 that is coupled to (and in communication with) the processor 202 (however, it should be appreciated that the computing device 200 could include output devices other than the presentation unit 206, etc.). The presentation unit 206 outputs information (e.g., evaluation indexes, etc.), either visually or audibly to a user of the computing device 200. Such user may include, for example, a consumer, users associated with merchants 102a-c, a user at payment network 106 associated with the operations described herein, analysts in a data warehouse, analysts associated with rewards and loyalty business units, etc. It should be further appreciated that various interfaces (e.g., as defined by web-based applications, webpages, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs, for example, from the user (i.e., user inputs) such as, for example, selections of aggregate merchant sets to audit, etc.; from other computing devices; etc. It should be appreciated that in various embodiments such inputs may be taken interactively as well as from analysts, and then used as appropriate to provide outputs, for example, via the output device 206. The input device 208 is coupled to (and in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the system 100 includes an evaluation engine 116, which is specifically configured, by executable instructions, to perform one or more of the operations herein. As shown in FIG. 1, the engine 116 is illustrated generally as a standalone part of the system 100, but, as indicated by the dotted lines, may be incorporated with the payment network 106, as desired. Alternatively, in other embodiments, the engine 116 may be incorporated with other parts of the system 100 (e.g., the issuer 108, etc.). In general, the engine 116 may be implemented and/or located, based on where, in path 112, for example, transaction data is stored, etc.

It should be appreciated that the evaluation engine 116 may be implemented in the system 100 in a computing device consistent with computing device 200, or in other computing devices within the scope of the present disclosure.

In various embodiments, the evaluation engine 116 is configured to access certain parameters associated with an identified aggregate merchant set, in the aggregate data structure 114 (e.g., two parameters for the aggregate merchant set comprising merchants 102a-c, etc.). In addition, the engine 116 is configured to access a fuzzy set (having multiple fuzzy linguistic variables or values) for each of the desired parameters, and a membership function also stored in the aggregate data structure 114 for each of the parameters (which defines the parameter's membership to one of the fuzzy set variables). Once accessed, the engine 116 is configured to fuzzify the parameters (e.g., generate fuzzy values for the parameters, etc.), for each of the variables in the fuzzy set, based on the membership function for the particular parameter. In so doing, the engine 116 essentially transforms the parameters into linguistic values of the fuzzy sets based on the membership functions of the parameters.

The engine 116 is also configured to apply certain linguistic value-based inference rules, also stored in the aggregate data structure 114, to the fuzzy values generated for the parameters associated with the identified aggregate merchant set. In connection therewith, the fuzzy values are combined into inference rule weights. And, the engine 116 is configured to then defuzzify the inference rule weights, by combination of the same, into an evaluation index.

Once generated, the engine 116 may be configured to further publish the evaluation index, alone or in combination with one or more other evaluation indexes, to a user or other person associated with the payment network 106 (or with another part of the system 100). Additionally, or alternatively, the engine 116 may be configured to compare the evaluation index to a predefined threshold, whereby the evaluation index can be used to indicate a need for audit of the identified aggregate merchant set, for example, when the evaluation index fails to satisfy the threshold.

FIG. 3 illustrates an exemplary method 300 for evaluating aggregate merchant sets. The exemplary method 300 is described as implemented in the evaluation engine 116, with additional reference to the payment network 106. However, it should be understood that the method 300 is not limited to this configuration of the evaluation engine 116 and/or its relation to the payment network 106, as the method 300 may be implemented in other ones of the computing devices 200 in system 100, or in multiple other computing devices. As such, the methods herein should not be understood to be limited to the exemplary system 100 or the exemplary computing device 200, and likewise, the systems and the computing devices herein should not be understood to be limited to the exemplary method 300.

The method 300 is also described herein with exemplary reference to an aggregate merchant set for "Jim's Grocery Store" (e.g., a target set or target merchant to be aggregated, etc.). In addition, for simplicity, the aggregate merchant set is described in connection with two parameters, e.g., a merchant monitoring score and a volatility score. With that said, it should be appreciated that any of the various different parameters described herein (or even other parameters), as being capable of association with aggregate merchant sets, may be used in other examples (e.g., in other example implementations of the method 300, etc.). It should also be appreciated that the parameters discussed in the method 300 with reference to FIG. 3 (and, for that matter, any other parameters associated with an aggregate merchant set as described herein), may have different values, scores, ranges, etc., than indicated herein, depending, for example, on one or more characteristics of the aggregate merchant set, etc.

An aggregate merchant set may be identified for audit for various reasons. For example, the aggregate merchant set may be identified based on a particular time frame (e.g., monthly, annually, etc.) or schedule. Or, the aggregate merchant set may be identified for other reasons, for example, based on changes in transaction amounts or volumes from month to month, changes in location counts from month to month, etc.

At 302 in the method 300, the engine 116 accesses parameters associated with the aggregate merchant set. The parameters are accessed by the engine 116 from the aggregate data structure 114. In general, the parameters that are accessed for the aggregate merchant set are predefined and comprise one or more different parameters pertaining to the aggregate merchant set being analyzed. Each parameter may include a current value, a range of possible values, and other values that pertain to the parameter. For example, for the aggregate merchant set for Jim's Grocery Store, the engine 116 accesses the merchant monitoring score parameter and the volatility score parameter. The accessed merchant monitoring score parameter for Jim's Grocery Store has a current value of 0.25 relative to a range of possible values of −3 to +3, and the volatility score parameter has a current value of 0.6 relative to a range of possible values of 0 to 1.

At this time (or later) in the method 300, the engine 116 also accesses membership functions from the aggregate data structure 114 for each of the accessed parameters. The membership functions are used during fuzzification of the parameters (e.g., in connection with different fuzzification techniques to translate the parameters as desired, etc.), as generally based on the membership functions of the evaluation index variable. In particular in the method 300, the engine 116 retrieves a fuzzy set for parameter A and a fuzzy set for parameter B. The engine 116 then retrieves membership functions for each of parameters A and B and, at 304 and 306, respectively, and determines the degree of membership of parameters A and B to each linguistic variable included in the fuzzy set, as defined by the corresponding membership function. It should be appreciated that fuzzy sets for more than two parameters may be retrieved in other embodiments, and that the method 300 is not limited to two parameters.

As an example, for the aggregate merchant set for Jim's Grocery Store, the engine 116 retrieves the fuzzy set for the merchant monitoring score parameter, where the fuzzy set includes three linguistic variables, e.g., negative, zero, and positive. In addition, the engine 116 also retrieves the corresponding membership function for the merchant monitoring score parameter. FIG. 4 illustrates an exemplary membership function 400 for the merchant monitoring score parameter for Jim's Grocery Store. The illustrated membership function 400 comprises a horizontal number line ranging in value from −3 to +3 (however, other ranges may be used in other examples). The horizontal number line generally represents the range of values of the merchant monitoring score that are being translated into linguistic variables of the fuzzy set. Above the horizontal number line, functions of the three linguistic variables associated with the fuzzy set for this example are shown as lines (i.e., negative 404, zero 406, and positive 408), with variable vertical values across the horizontal number line. The linguistic variable lines are displayed as ranging in value from 0 to 1. In "fuzzy logic", rather than a value being true (1) or false (0), it is possible for a value to have a membership value in a range between 0 and 1. The linguistic variable lines 404-408 of the membership function 400 reflect that, at some possible values of the merchant monitoring score, the linguistic variables have membership values between 0 and 1. For instance, at vertical line 410, which represents the merchant monitoring score of 0.25 for Jim's Grocery, the linguistic variable zero has a membership value of 1, the linguistic variable negative has a membership value of 0.25, and the linguistic membership variable positive has a value of 0.75. In addition, the various functions 404-408 overlap at various points throughout the monitor score range, resulting in fuzzy membership values of the monitor score within each of the linguistic variables.

It should be appreciated that the membership functions, for each linguistic variable in the fuzzy set associated therewith, may be predefined by a domain expert to accurately reflect results during use. In addition, the membership functions may be altered at a later point, for instance, to increase accuracy of the resulting evaluation. Further, while the exemplary membership functions shown in FIG. 4 are generally trapezoidal in shape, they may be represented as other discrete or continuous functions in other examples, such as triangular, logistic, Gaussian, etc.

It should be further appreciated that, in some embodiments, membership functions may include more than three (e.g., four, five, six, etc.) or less than three (e.g., two, etc.) linguistic variables. For instance, FIG. 5 illustrates an exemplary membership function 500 for a merchant monitoring score parameter, where the membership function 500 includes four linguistic variables, e.g., low, medium, high, and very high. In this example, the membership function 500 ranges from 0 to 10, such that a monitor score determined therefrom may also range from 0 to 10. And, functions of the four linguistic variables associated with the fuzzy set for this example are shown as lines (i.e., low 502, medium 504, high 506, and very high 508), with variable vertical values across a horizontal number line of the function 500. The low function 502 and the very high function 508 generally define trapezoid shapes, while the medium function 504 and the high function 506 generally define triangle shapes. Again, the various functions 502-508 overlap at various points throughout the monitor score range, resulting in fuzzy membership values of the monitor score within each of the linguistic variables. In another example, a membership function includes only two linguistic variables, for example, low and high, etc.

Again, the membership functions 400 and 500, illustrated in FIGS. 4 and 5, respectively, are only exemplary in nature. It should be appreciated that different membership functions may be implemented in different embodiments. It should also be appreciated that membership functions can be constructed or built in different manners. For example, in various embodiments, membership functions may be built based, at least in part, on feedback from data analysts, etc.

Referring again to FIG. 3, more particularly at 304, values for parameter A are translated into membership values for each of the linguistic variables M included in the corresponding fuzzy set, using the corresponding membership function for parameter A (e.g., membership function 400 shown in FIG. 4, membership function 500 shown in FIG. 5, etc.). Similarly, at 306, values for parameter B are translated into membership values for each of the linguistic variables N included in the corresponding fuzzy set, using the corresponding membership function for parameter B (not shown).

As an example, for the aggregate merchant set for Jim's Grocery store, parameter A is the merchant monitoring score (M), which has a value of 0.25 and a range of −3 to +3, and parameter B is the volatility score (V), which has a value of 0.6 with a range of 0 to 1. The linguistic variables of M, included in the corresponding fuzzy set for Jim's Grocery Store, are "negative", "zero", and "positive". The linguistic variables of V, included in the corresponding fuzzy set for Jim's Grocery Store, are "low", "medium", and "high". In this example, and as shown in FIG. 4, the membership function 400 for the linguistic variables of M defines, for the merchant monitoring score (M) of 0.25, the negative membership value to be 0.25, the zero membership value to be 1, and the positive membership value to be 0.75. Likewise (although not show), the membership function for the linguistic variables of V defines, for the volatility score of 0.6, the low membership value to be 0, the medium membership value to be 0.4, and the high membership value to be 0.6. Table 1 illustrates the membership values for the linguistic variables of M and V for the Jim's Grocery.

TABLE 2

| Linguistic Variable | Value |
|---|---|
| $M_{negative}(0.25) =$ | 0.25 |
| $M_{zero}(0.25) =$ | 1 |
| $M_{positive}(0.25) =$ | 0.75 |
| $V_{low}(0.6) =$ | 0 |
| $V_{medium}(0.6) =$ | 0.4 |
| $V_{high}(0.6) =$ | 0.6 |

Next in the method 300, once the membership values of each of the linguistic variables are determined, for each of parameters A and B, the engine 116 accesses inference rules, at 308, from aggregate data structure 114 for each of the parameters A and B. The engine 116 then applies a set of corresponding inference rules, at 310, to each of the linguistic variable values for each of the parameters A and B. The set of inference rules may comprise one or many different rules. In general, the inference rules are "fuzzy rules," in that they make use of the "fuzzy" linguistic variables, and their values which have been generated using the original parameters A and B. For example, an inference rule may be in the form of "If the linguistic variable of the merchant monitoring score is negative and the linguistic variable of the volatility score is low, then the Evaluation Index is low". In this example, the rule contains an AND logical operator, but inference rules may contain other logical operators as well, such as OR and NOT. In addition, it should be appreciated that the inference rules generally do not contain discrete number values, but rather "fuzzy" linguistic values. As a result, the inference rules are general rather than exact. It should be appreciated that various different approaches may be applied in the fuzzy inference system, with minor variations implemented, as desired, to improve output.

As an example, again for the aggregate merchant set for Jim's Grocery store, where parameter A is the merchant monitoring score (M) and parameter B is the volatility score (V), the inference rules may comprise a rule which is dependent on each possible combination of linguistic variables of M and V. Exemplary inference rules are illustrated in Table 2, in which the linguistic variables of M are provided across a top of the table and the linguistic variables of V are provided across the left side of the table. The values where the columns and rows intersect, then, represent the evaluation index when the linguistic variables of M and the linguistic variables of V have those values. Thus, one rule represented in Table 2 is "If the linguistic variable of M is negative and the linguistic variable of V is low, then the Evaluation Index is low." Another rule represented in Table 2 is "If the linguistic variable of M is positive and the linguistic variable of V is high, then the Evaluation Index is high."

TABLE 3

| | | M | | |
|---|---|---|---|---|
| | | Negative | Zero | Positive |
| V | Low | Low (L) | Low (L) | Medium (M) |
| | Medium | Low (L) | Medium (M) | High (H) |
| | High | Medium (M) | Medium (M) | High (H) |

In connection with applying the inference rules to the membership values obtained from the original parameters A and B, rule weights may be calculated by the engine 116. Due to the membership functions, in general, having overlapping values at certain inputs, it is possible for the inference rules, alone, to yield the same results after fuzzification (e.g., dependent on how the membership functions were defined, etc.). For example, if the membership function for the merchant monitoring score parameter for Jim's Grocery Store defines a value for the zero linguistic variable ($M_{zero}$) to be 0.5 and a value for the positive linguistic variable ($M_{positive}$) to be 0.5, it is not clear which inference rule to use to generate an evaluation index. However, through the use of a system of rule weights, the results of each inference rule can be evaluated and considered together (e.g., weights from all rules are used for computing the evaluation index score, etc.).

Rule weight functions may make use of the determined membership values of the linguistic variables in combination with each other for each inference rule. Fuzzy logic comprises operators similar to Boolean logic operators, such as complement, union, and intersection. Because the values in fuzzy logic are not binary, the operators function differently (for instance, NOT x=1−x, x AND y=minimum(x, y), and x OR y=maximum(x, y)). An inference rule may make use of any or all logic operators, as well as different orders of operations (parentheses) to infer values from the group of linguistic variables. In various embodiments, the use of which operator may depend on how the rule was developed. For example, what operator the rule is using, the same operator is used for evaluation purposes. With that in mind, the exemplary rules provided in Table 2 all make use of an AND operator. As such, the rule weight for each of the rules in Table 2 is derived from taking the minimum of the calculated membership values, and may be calculated as follows (with the resulting rule weights for Jim's Grocery Store then shown in Table 3):

$$W_x = \min[M_{fuzzy\ linguistic\ value}, N_{fuzzy\ linguistic\ value}]$$

$$W_1 = \min[M_{negative}(0.25), N_{low}(0.6)] = \min[0.25, 0] = 0$$

$$W_2 = \min[M_{negative}(0.25), N_{medium}(0.6)] = \min[0.25, 0.4] = 0.25$$

$$W_3 = \min[M_{negative}(0.25), N_{high}(0.6)] = \min[0.25, 0.6] = 0.25$$

$$W_4 = \min[M_{zero}(0.25), N_{low}(0.6)] = \min[1, 0] = 0$$

$$W_5 = \min[M_{zero}(0.25), N_{medium}(0.6)] = \min[1, 0.4] = 0.4$$

$$W_6 = \min[M_{zero}(0.25), N_{high}(0.6)] = \min[1, 0.6] = 0.6$$

$$W_7 = \min[M_{positive}(0.25), N_{low}(0.6)] = \min[0.75, 0] = 0$$

$W_8=\min[M_{positive}(0.25),N_{medium}(0.6)]=\min[0.75,0.4]$
$=0.4$ $W_9=\min[M_{positive}(0.25),N_{high}(0.6)]=\min[0.75,0.6]=0.6$ While minimum values are used/indicated in the above equations/calculations, it should be appreciated that maximum values may also (or alternatively) be used depending, for example, on how the rules are designed, etc.

The rule weight values shown in Table 3 represent a degree or weight given to the corresponding inference rule when determining the evaluation index. While described herein, it should be appreciated that rule weight values may not be used, and are not required, in all embodiments. Further, rule weight values may be calculated in other embodiments in manners different from those described herein, but still used in the manner provided in method 300.

TABLE 4

| | | M | | |
| --- | --- | --- | --- | --- |
| | | Negative | Zero | Positive |
| N | Low | 0 ($W_1$) | 0 ($W_4$) | 0 ($W_7$) |
| | Medium | 0.25 ($W_2$) | 0.4 ($W_5$) | 0.4 ($W_8$) |
| | High | 0.25 ($W_3$) | 0.6 ($W_6$) | 0.6 ($W_9$) |

With continued reference to FIG. 3, at 312, the engine 116 generates an evaluation index value for the aggregate merchant set, via a "defuzzification" process. Example defuzzification techniques include, without limitation, "center of mass" techniques, "center of gravity" techniques, "max-min" techniques, averaging techniques, "root-sum-square" techniques, etc. As can be seen, the outputs from the rules will be combined in the output distribution, i.e., the evaluation index (output variable), as appropriate.

As an example, and without limitation, a "center of mass" defuzzification process may be used, in connection with the rules from Table 2 and the rule weight values from Table 3, to calculate a single value for the evaluation index for Jim's Grocery Store. In so doing, the process employs values for low (L), medium (M), and high (H) of between 0 and 1, specifically 0 (L), 0.5 (M), and 1 (H), respectively, in order to convert the rules from Table 2 to numerical values. The engine 116 then determines the evaluation index (EI), in this example, to be 0.65 as follows:

$$EI = \frac{\left(\begin{array}{c} W_1*L + W_2*L + W_3*M + W_4*L + W_5*M + W_6*M + W_7* \\ M + W_8*H + W_9*H \end{array}\right)}{\sum_{i=1}^{9} W_i}$$

$$EI = \frac{\left(\begin{array}{c} (0*0) + (.25*0.5) + (.25*0.5) + (0*0) + (.4*.5) + \\ (.6*.5) + (0*.5) + (.4*1)*(.6*1) \end{array}\right)}{(0+.25+.25+0+.4+.6+0+.4+.6)} = 0.65$$

It should be appreciated that the values 0 (L), 0.5 (M), and 1 (H) used in this example are exemplary in nature and may change depending upon how domain experts make assignments. In addition, it should be appreciated that other processes may be used to assign/calculate values for evaluation indexes.

Because the rule weight values are between 0 and 1 in this example, the numerator in the evaluation index calculation will be less than or equal to the denominator and the resulting evaluation index will also range from 0 to 1. The evaluation index may be normalized to a range from 0 to 100, as necessary or desired, or to some other range.

Once generated, the engine 116 evaluates the evaluation index to determine if it satisfies a predefined threshold, at 314. The threshold may be used to determine whether or not an audit is necessary for the aggregate merchant set and, as such, may be set to a level that results in acceptably accurate and up-to-date aggregate merchant sets. Frequency of audits and cost required to run the audits may also be considered when setting the threshold. In addition, in some embodiments, the threshold may be adjusted as necessary, or periodically to ensure accurate decision-support regarding auditing of aggregate merchant sets.

In particular, when the generated evaluation index does not satisfy the threshold, at 314, the aggregate merchant set may be flagged for auditing, at 316. The audit of the aggregate merchant set may not occur immediately, so a flag or value is set in a data structure associated with the aggregate merchant set which indicates that needs to be audited for accuracy. Alternatively, or additionally, the engine 116 may append the aggregate merchant set to a list or queue of aggregate merchant sets that need to be audited. The list may be a simple list maintained by the engine 116, or other, in the order in which aggregate merchant sets are added or evaluated. Or, the list may be a list that is ordered by priority, where the priority of the audit may be based on one or more factors associated with the aggregate merchant set. For example, the evaluation index itself may be used in determining a priority for auditing the aggregate merchant set (e.g., based on a numerical hierarchy of evaluation indexes such as a range of 1-2 representing less need for audit, a range of 5-7 representing moderate need for audit, and a range of 9-10 representing high need for audit; etc.). The engine 116 may also sort aggregate merchant sets within the list, or otherwise, into priority levels, rather than in an exact order, based on their evaluation indexes. Once flagged, a system process or a user may then select the aggregate merchant set for auditing.

Alternatively, or additionally, in the method 300 (as indicated by the dotted lines in FIG. 3), the engine 116 may publish the generated evaluation index for the aggregate merchant set, at 318. In connection therewith, the evaluation index can then be used, by a user, to determine whether the aggregate merchant should be audited for accuracy or, if a decision to audit the aggregate merchant set has already been made, to aid the user in understanding how the decision was made. As shown in FIG. 3, such publication may be done generally at any time after the engine 116 generates the evaluation index (e.g., following generation of the evaluation index at 312, when the evaluation index satisfies the predefined threshold at 314, after the evaluation index is flagged, etc.).

The evaluation index may be published, by the engine 116, to an interface viewable via the presentation unit 206 of FIG. 2. The interface may provide only the evaluation index or it may provide additional information with the evaluation index. As an example, the engine 116 may publish various information associated with the aggregate merchant set along with the evaluation index, such as the name and/or ID of the aggregate merchant set, which data values have been aggregated for the set, rules of the aggregation, a variation of the data caused by the aggregation, etc. Additionally, the interface may include information regarding past evaluation indexes in order to provide context for the current evaluation index, statistics about whether aggregate merchant sets with similar evaluation indexes have been audited and the corresponding results of such audits, etc. Such information may be provided in any desired form such as numerical, graphical, etc. Further, the interface may be interactive and may provide the user with the ability to flag the aggregate merchant set for audit or indicate that an audit is not needed for the aggregate merchant set. If the aggregate merchant set has already been flagged for audit, the user may be able to override the flag through the use of the interface.

In view of the above, the systems and methods herein may permit accurate determination of the necessity of audits for aggregate merchant sets in a system which receives large amounts of data containing variations from sets of merchants. It is important for a payment network or other parties to ensure that sets of merchants are properly aggregated, but it is also important for the payment network to avoid auditing aggregate merchant sets unnecessarily, which wastes resources. The described systems and methods enable the use of a fuzzy-rule based inference system to compute an evaluation index score and determine whether an audit is necessary. Advantageously, the described inference system enables a payment network to determine audit necessity based on a variety of factors, while weighting those factors appropriately, in order to ensure accurate decision making.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) accessing a monitor score and a volatility score for an aggregate merchant set, the aggregate merchant representative of multiple merchants having at least one disparate parameter in a transaction data structure; (b) accessing a first fuzzy set associated with the monitor score and a second fuzzy set associated with the volatility score, the first fuzzy set including at least three first fuzzy linguistic variables and the second fuzzy set including at least three second fuzzy linguistic variables; (c) accessing one or more inference rules comprising logical operations applied to one or more linguistic variables from the first and second fuzzy sets; (d) determining a degree of membership of the monitor score, for the aggregate merchant set, to the first fuzzy set; (e) determining a degree of membership of the volatility score, for the aggregate merchant set, to the second fuzzy set; and (f) generating an evaluation index for the aggregate merchant set, based on the inference rules and the degrees of membership to the first and second fuzzy sets, thereby providing an indication of a propriety of the aggregation of said multiple merchants.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for evaluating aggregate merchant sets including multiple merchants, the system comprising:
   a processor;

a memory in communication with the processor, the memory comprising processor-executable instructions, which when executed by the processor, cause the processor to:
- access one or more parameters of an aggregate merchant set, the aggregate merchant set representative of a plurality of merchants having at least one disparate parameter in a transaction data structure, the one or more parameters each comprising at least one parameter value, and the one or more parameters including one or more of: a monitoring score, a volatility score, a score indicating a count of merchants in the aggregate merchant set, a last audit date for the aggregate merchant set, and a predictor score;
- access fuzzy sets, the fuzzy sets comprising one fuzzy set for each parameter of the one or more parameters, each fuzzy set comprising one or more linguistic variables associated with the parameter with which the fuzzy set is associated;
- access one or more inference rules comprising logical operations applied to the one or more linguistic variables from the fuzzy sets;
- translate parameter values of the one or more parameters into membership values associated with the one or more linguistic variables of the fuzzy sets, based on membership functions, wherein the membership values each include a degree of membership of the respective one or more parameters in one of the fuzzy sets;
- calculate rule weights based on the inference rules and the degrees of membership to the respective ones of the fuzzy sets;
- generate an evaluation index for the aggregate merchant set based on combining the inference rules with the rule weights, wherein the evaluation index indicates a degree to which an audit is necessary for the aggregate merchant set; and
- publish aggregate merchant information comprising the evaluation index.

2. The system of claim 1, wherein the membership functions include a function for each variable in the fuzzy set, each function of the membership function defining a triangle, a trapezoid, a Gaussian, or a logistic function.

3. The system of claim 2, wherein at least two functions of the membership function overlap.

4. The system of claim 1, wherein the processor-executable instructions cause the processor, in order to generate an evaluation index, to define a center of mass of the calculated rule weights.

5. The system of claim 1, wherein the processor-executable instructions cause the processor, in order to calculate the rule weights, to calculate a minimum of the degrees of membership corresponding to the one or more linguistic variables, when the inference rules employ an AND logical operation.

6. The system of claim 1, wherein the processor-executable instructions cause the processor, in order to calculate the rule weights, to calculate a maximum of the degrees of membership corresponding to the one or more linguistic variables, when the inference rules employ an OR logical operation.

7. The system of claim 1, wherein the processor-executable instructions cause the processor, in order to generate an evaluation index, to define a center of mass of the calculated rule weights, by:

$$\frac{\left( \begin{array}{c} W_1 * L + W_2 * L + W_3 * M + W_4 * L + W_5 * M + W_6 * M + W_7 * \\ M + W_8 * H + W_9 * H \end{array} \right)}{\sum_{i=1}^{9} W_i}$$

where L, M, and H represent values for the inference rules based on an interaction of the one or more linguistic variables from the fuzzy sets, and where $W_x$ represents rule weights for each of the interactions of the one or more linguistic variables from the fuzzy sets.

8. A non-transitory computer readable media including executable instructions for evaluating aggregate merchant sets, which when executed by a processor, cause the processor to:
- access, from a memory, multiple parameters of an aggregate merchant set, the aggregate merchant set representative of a plurality of merchants, the aggregate merchant set having at least one disparate parameter in a transaction data structure, the multiple parameters each comprising at least one parameter value, the multiple parameters including: a monitoring score, a volatility score, a score indicating a count of merchants in the aggregate merchant set, a last audit date for the aggregate merchant set, and/or a predictor score;
- access, from the memory, fuzzy sets, the fuzzy sets comprising one fuzzy set for each parameter of the multiple parameters, each fuzzy set comprising one or more linguistic variables associated with the parameter with which the fuzzy set is associated;
- access, from the memory, one or more inference rules comprising logical operations applied to the one or more linguistic variables from the fuzzy sets;
- translate parameter values for each of the multiple parameters into membership values associated with the one or more linguistic variables of the fuzzy sets, based on multiple membership functions, each membership function associated with one of the parameters values for one of the multiple parameters, wherein the membership values each include a degree of membership of the respective one of the multiple parameters in one of the fuzzy sets;
- calculate rule weights based on the inference rules and the degrees of membership to the respective ones of the fuzzy sets; and
- generate an evaluation index for the aggregate merchant set based on at least combining the inference rules with the rule weights, wherein the evaluation index indicates a degree to which an audit is necessary for the aggregate merchant set.

9. The non-transitory computer readable media of claim 8, wherein the membership functions comprise at least one of: a triangle, a trapezoid, a Gaussian, and a logistic function.

10. The non-transitory computer readable media of claim 8, wherein the multiple parameters include at least the volatility score for the aggregate merchant set.

11. The non-transitory computer readable media of claim 8, wherein the executable instructions cause the processor, in order to calculate the rule weights, to determine a minimum of the degrees of membership corresponding to the one or more linguistic variables.

12. The non-transitory computer readable media of claim 8, wherein the executable instructions cause the processor, in order to generate an evaluation index, to calculate a center of mass of the calculated rule weights.

13. The system of claim 4, wherein the processor-executable instructions cause the processor, in order to translate the parameter values, to identify one of the degrees of membership for each of the one or more linguistic values of the fuzzy sets, based on a monitoring score membership function.

14. The system of claim 1, wherein the processor-executable instructions cause the processor, in order to calculate the rule weights, to calculate one of said rule weights for each combination of the degrees of membership in the fuzzy sets, based on the following equation:

$$W = \min[M_{fuzzy\ linguistic\ value}, N_{fuzzy\ linguistic\ value}].$$

15. The non-transitory computer readable media of claim 9, wherein the executable instructions, when executed by the processor, further cause the processor to publish the evaluation index to a user, when the evaluation index exceeds a predefined threshold, thereby providing an indicator for audit of the aggregate merchant set.

\* \* \* \* \*